United States Patent

Freund et al.

[19]

[11] Patent Number: 5,900,386

[45] Date of Patent: May 4, 1999

[54] SHELL CATALYSTS, PROCESSES FOR THEIR PREPARATION AND THEIR USE

[75] Inventors: Andreas Freund, Kleinostheim; Peter Panster, Rodenbach, both of Germany

[73] Assignee: Degussa Aktiengesellschaft, Frankfurt, Germany

[21] Appl. No.: 08/892,104

[22] Filed: Jul. 14, 1997

Related U.S. Application Data

[63] Continuation of application No. 08/569,013, Dec. 7, 1995, abandoned.

[30] Foreign Application Priority Data

Dec. 8, 1994 [DE] Germany ............................ 44 43 701

[51] Int. Cl.$^6$ ........................................................ B01J 23/58
[52] U.S. Cl. ...................... 502/330; 502/325; 502/184; 502/185; 502/174; 502/180; 502/340; 502/355; 502/349; 502/302; 502/344
[58] Field of Search ........................... 502/325, 330, 502/184, 185, 174, 180, 340, 355, 349, 302, 344

[56] References Cited

U.S. PATENT DOCUMENTS

| | | | |
|---|---|---|---|
| 1,098,176 | 5/1914 | Schwerin | 502/330 |
| 3,011,920 | 12/1961 | Shipley | 117/213 |
| 4,136,059 | 1/1979 | Jalan et al. | 252/425.3 |
| 4,714,692 | 12/1987 | Abrevaya et al. | 502/261 |
| 5,147,841 | 9/1992 | Wilcoxon | 502/173 |
| 5,693,586 | 12/1997 | Nicolau et al. | 502/330 |
| 5,700,753 | 12/1997 | Wang et al. | 502/330 |

FOREIGN PATENT DOCUMENTS

| | | |
|---|---|---|
| 0050300 | 4/1982 | European Pat. Off. . |
| 0580559 | 1/1994 | European Pat. Off. . |

OTHER PUBLICATIONS

Official Action from the European Patent Office dated Oct. 4, 1996.

Nakao et al., J. Colloid Interface Sci. (1989), 131: 186–191.–no month.

A. Honji et al., J. Electrochem. Soc. (1990), 137: 2084–2088.–no month.

Chemical Abstracts (107:121886 CA), "Controlled Preparation of Monodisperse Bimetallic Palladium–Gold Colloids with Three Different Microstructures and Their Use", Michel et al., 1987.

*Primary Examiner*—Walter D. Griffin
*Assistant Examiner*—Nadine Preisch
*Attorney, Agent, or Firm*—Smith, Gambrell & Russell, LLP; Beveridge, DeGrandi, Weilacher & Young; Intellectual Property Group

[57] ABSTRACT

Disclosed are shell catalysts which contain, on powdered or shaped supports, one or more metals from groups VIII and IB of the Periodic Table of Elements. The catalysts are obtained by coating the support with the catalytically active metals in aqueous solutions of mono- or bimetallic colloids of these metals, wherein the colloids are stabilized by highly hydrophilic surfactants.

33 Claims, No Drawings

1

SHELL CATALYSTS, PROCESSES FOR THEIR PREPARATION AND THEIR USE

This application is a continuation application under 37 CFR 1.62 of prior application Ser. No. 08/569,013, filed on Dec. 7, 1995, now abandoned, which application is entirely incorporated herein by reference.

INTRODUCTION AND BACKGROUND

The present invention relates to shell catalysts which contain one or more metals from the groups VIII and IB of the Periodic Table of Elements on a powdered or formed support. In another aspect, the present invention relates to a method for their preparation using preformed, surfactant-stabilized mono- or bimetallic colloids of the metals concerned, and methods of use of the catalysts.

Shell catalysts are those in which the catalytically active components, generally specific metals or noble metals, are essentially concentrated in a more or less thick outer shell of the catalyst particle. There are preferably used in catalytic reactions and there is a danger that over-reaction can occur if the reactants are in contact with the catalytically active components for too long a time. They are also preferably used in those reactions in which transport of material to the catalytically active components in the interior of the catalyst particle restricts catalytic activity.

The preparation of shell catalysts, in particular on porous supports, using conventional impregnation techniques generally requires precoating of the catalyst particle with reagents and materials which hinder deep penetration of the catalytic components into the catalyst particles. Nevertheless, only relatively thick shells, more than 0.1 mm thick, are possible using this technique.

Thinner shells can be produced using colloidal techniques in which the catalytically active components are deposited on the catalyst particles or catalyst supports in the form of colloids.

Known colloid techniques sometimes include separate preparation of the metal colloids and/or in situ methods without isolation of the colloidal metal particles produced as intermediates. The metal colloids may be present either in a reduced form or also in a non-reduced form.

Nakao et al. (J. Colloid Interface Sci. (1989), 131: 186) describe the adsorption of aqueous, surfactant-stabilized noble metal colloids on ion exchangers. Polyethyleneglycol ethers, tetraalkylammonium halides or alkylbenzenesulfonates, for example, were used as neutral, cationic and anionic surfactants. The metal content of the noble metal colloid solutions was less than 0.1 g/l (ca. 0.01 wt. % of metal).

A. Honji et al. (J. Electrochem. Soc., (1990), vol. 131) describe the use of sugar esters of long-chain carboxylic acids, such as e.g. sorbitane monolaurate, for the preparation of surfactant-stabilized Pt colloids. Methanol in a large excess is used as reducing agent. The colloids are preferably prepared in situ in the presence of a support.

The known processes have the disadvantage that highly dilute colloidal solutions have to be used, for stability reasons, in comparison to conventional impregnation processes. This means, however, that catalysts with only relatively small amounts of deposited metal can be prepared. Typical metal contents for this type of catalyst are less than 1 wt. % with respect to the dry weight of the catalyst. Higher metal contents of more than 5 wt. % or even more than 10 wt. %, such as those required for fuel cell catalysts, for instance, cannot be prepared using highly dilute colloidal solutions. Although the in situ process does enable the use of more highly concentrated production mixtures, the properties of the colloid particles produced in this way and fixation of them to supports can only be controlled to a limited extent. A number of critical preparation parameters, such as e.g. temperature, concentrations of bases, reducing agents, etc., have to be adjusted very precisely and often at the same time in order to deposit the metal colloid onto a support in the desired form.

SUMMARY OF THE INVENTION

One object of the present invention is to provide shell catalysts which offer good accessibility to the catalytically active metals and a high activity in a variety of catalytic reactions such as the hydrogenation and oxidation of organic compounds and also in the catalytic reduction of oxygen in fuel cells. Another object of the present invention is to provide a process for preparing these catalysts which avoids the disadvantages described above.

The first object of the invention listed above is achieved by shell catalysts which contain one or more metals from groups VIII and IB in the Periodic Table of Elements on a powdered or shaped support. The catalysts are characterized in that the metals are present on the support in a finely divided form within a outer shell of at most 200 nm thickness, preferably of at most 100 nm, with crystallite sizes of at most 10 nm, preferably less than 3 nm, in concentrations of 0.05 to 35 wt. % with respect to the dry mass of the catalyst.

The second object of the invention listed above is achieved by a process for preparing shell catalysts by using preformed, surfactant-stabilized mono- or bimetallic colloids of metals from groups VIII and IB in the Periodic Table of Elements. The process is characterized in that the colloids are stabilized by highly hydrophilic surfactants and aqueous solutions of one or more of these colloids are used to coat the support.

Another object of the present invention is to provide methods for hydrogenating or oxidizing isolated and/or conjugated C—C double bonds in aromatic compounds, non-aromatic compounds, carbonyl compounds, or carboxylic acids, for reducing N—O compounds, and for the hydrogenolysis of C—O, C—N and C—X compounds wherein X is F, Cl, Br or I, by contacting the shell catalyst with such compounds.

Yet another object of the present invention is to provide a method of electrocatalysis involving utilizing the shell catalyst as an electrocatalyst in fuel cells.

DETAILED DESCRIPTION OF THE INVENTION

According to the invention it has been found that concentration of the catalytically active metals in an outer shell of less than 200 nm thickness ensures good accessibility to the active centers for the particular reactants in the intended catalytic reaction.

Catalysts according to the present invention may contain the catalytically active components in concentrations of between 0.05 and 35 wt. %, preferably between more than 1 wt. % to 35 wt. %. Concentrations of between 0.5 and 35 wt. %, in particular between 0.5 and 5 wt. %, are preferred if the catalytic reactions involve hydrogenation or oxidation of organic compounds.

For use as electro-catalysts in fuel cells, the preferred concentration is between 7.5 and 35 wt. %. Even at these high concentrations, catalysts according to the invention with crystallite sizes of catalytically active metals of at most 10 nm, preferably at most 3 nm, exhibit very good dispersion of these metals.

Suitable supports for the catalysts are powdered or formed supports of carbon and of oxides of one or more metals from groups IIA to VA and IB to VIIB and VIII of the Periodic Table of Elements. Furthermore, carbonates, sulfates, zeolites, organo-functional polysiloxanes and ion exchange resins are also suitable as supports. Choice of the suitable inert support material depends on the intended catalytic reaction. For hydrogenation or oxidation of organic compounds and for the catalytic reduction of oxygen in fuel cells, carbon supports are preferably used, these being either hydrophilic or hydrophobic.

For stabilizing the metal colloids, surfactants with one or more hydrophilic groups are advantageous, such as for example, betains, cationic surfactants, fatty alcohol-polyglycol ethers, polyoxymethylene-carbohydrate-fatty alkyl esters and anionic surfactants or amphiphilic sugar surfactants. Suitable betains are, for example, (trialkylammonio)-alkylsulfonates, alkyl-N,N-dimethyl-N-carboxymethylammonium betains and alkylamidopropyl betains. 3-(dimethyldodecylammonio)-propanesulfonate (Sulfobetain 12®), lauryl-N,N-dimethyl-N-carboxymethyl-ammonium betain (Rewoteric AM DML®) or cocoami-dopropyl betain have proven to be especially advantageous. These surfactants are well known in the art Cationic surfactants which may be used are (chlorohydroxypropyl)alkyldimethylammonium salts, in particular Quab 360®, Quab 342® or Quab 926® (Degussa AG trade marks). Suitable fatty alcohol-polyglycol ethers are, for example, polyoxyethylene-lauryl ether. A preferred polyoxyethylene-carbohydrate fatty alkyl ester is the corresponding sorbitane monolaurate. An example of an anionic surfactant is sodium cocoamidoethyl-N-hydroxyethyl glycinate. The group of alkylpolyglycosides as amphiphilic sugar surfactants may also be used for stabilizing the metal colloids. These surfactants are also well known in the art.

Preformed, mono and bimetallic colloids based on elements from groups VIII and IB of the Periodic Table of Elements may be obtained by reduction of their salts in the presence of the highly hydrophilic surfactants mentioned above in either an aqueous or an organic phase. By separating preparation of the colloid from fixing it to the support, the particle sizes of the metal colloids can be controlled in an expedient manner. The average particle size of the colloids can be varied in a range between 1 and about 50 nm via the concentration of protective colloid, the type of solvent and/or reducing agent, and by the temperature during preparation. This can be readily determined by persons skilled in the art. For applications in catalysis, average particle sizes of less than 10 nm are advantageous. Average particle sizes of less than 5, in particular of less then 3 nm, are preferably used.

The metal colloids are produced in dissolved form during preparation. To fix them onto support materials, these solutions may be used directly without further treatment. Preferably, however, the colloids are isolated in the form of powders before further processing.

This is especially advantageous when preparing metal colloids in organic solvents. This means that organic solvents are not involved during the subsequent support fixing procedure. The method for preparing catalysts according to the invention requires no additional measures with regard to protecting the environment because it can be applied in existing production plants. The metal concentrations in the dry weight of colloid powder is usually at least 5 wt. %.

Higher metal concentrations in the powder are possible by separating from an electrolyte and/or by lower concentrations of surfactant during production of the colloid. These higher metal contents may be of advantage during adsorption of the colloids onto certain support materials.

The powdered metal colloids may be redispersed in water in a simple manner. This may take place immediately or several weeks before further use of the metal colloids. A particular advantage of the process according to the invention as compared with the prior art is the fact that very high metal concentrations can be obtained in solution due to the colloids being stabilized by highly hydrophilic surfactants. Metal contents of up to 25 wt. % may be obtained in solution. This concentration range for the metal colloid solution is of the same order of magnitude as the concentration of many metal salt solutions. Metal colloid solutions may therefore also be used, for instance, as an alternative during the preparation of fixed bed catalysts by the pore volume impregnation process or the immersion process for impregnating honeycomb structures or other catalytic structures; such processes are known in the art.

The metal colloids may be fixed onto powdered support materials by adding the colloidal solution to an aqueous support suspension or by adding the support to the colloidal solution. Adsorption may be performed at room temperature. It is expedient, however, to raise the temperature of the solution to at least 30° C. during the adsorption process in order to accelerate adsorption, in particular for metal concentrations of more than 3 wt. %. The solution temperature is advantageously adjusted to a value between 30° and 95° C., preferably between 50° and 85° C. In this way, the time up to complete adsorption can be reduced to less than one hour, in very favorable cases to less than half an hour.

Alternatively, adsorption times at room temperature can clearly be shortened, or generally facilitated, by adding electrolytes such as, for example, salts of the main groups IA, IIA, IIIA or of the lanthanides. The addition of electrolytes to the solution can also support the adsorption process at elevated temperatures.

Differently from conventional impregnation techniques, the fixation on hydrophobic (i.e., hard to wet with water) carbon supports or carbon-containing supports with the colloid solutions being used according to the invention presents no problems. In contrast, the rate of adsorption is affected in a negative manner by an increasing hydrophilic character of the carbon support This type of support has a high proportion of surface oxides as a result of the method of production or due to an oxidizing washing process or an oxidative aftertreatment. The degree of hydrophilicity is determined by the proportion of surface oxides. Adsorption of the colloids onto these supports can be forced by adding electrolytes and/or by the use of metal colloid powders with higher metal contents.

Reduction of the catalysts and the handling of precipitation reagents and adjustment of the pH with bases or acids is not required when preparing shell catalysts by the process according to the invention.

Using the methods mentioned above, or combinations thereof, the metal colloids can be fixed onto a very wide variety of support materials. Adsorption of the colloids is independent of the support surface area (BET surface area, geometric surface area as a function of particle size). The support may be present as a powder, in lumps (granules, pellets, spheres, etc), honeycomb structures or as twodimensional or three-dimensional substrates or structures (foam ceramics, gel packings). Examples of support materials include carbon supports, oxidic supports, carbonates, sulfates, zeolites, Deloxans® (Degussa trade mark for an organo-functional polysiloxane) and polymers.

Carbon supports or carbon-containing supports which may be used include activated carbon, carbon black, graphitized carbon black, graphite, carbides, supported carbides and their physical mixtures, wherein adsorption of the metal colloids, as mentioned above, can always be forced by appropriate means, independently of the hydrophobic or hydrophilic character of the carbon-containing support.

Suitable oxidic supports are in particular oxides of one or more metals from the groups IIA to VA and IB to VIIB and VIII in the Periodic Table of Elements. Aluminum oxide, silicon dioxide, titanium oxide, zirconium oxide, magnesium oxide and mixed oxides thereof are preferred.

After depositing the metal colloid onto a powdered support material the catalyst is filtered off and washed with deionized water. The catalyst obtained in this way contains ca. 60 wt. % of water and may be used in this form as a water moistened catalyst paste for catalytic applications in liquid phase processes.

If a dry form is required, the moist catalyst may be dried, preferably under vacuum. The latter procedure is applied in particular to non-powdered catalysts and structures. If the surfactant interferes with a subsequent application, it may be decomposed oxidatively or thermally under an inert gas atmosphere at temperatures between 200° and 500° C.

Deposition of the metal colloid on the support material takes place in the form of a shell. For porous supports, such as e.g. activated carbon, depths of penetration of less than 200 nm in the case of powders and 20 $\mu$m in the case of 2–4 mm granules are found. This data also applies in principle to other support materials. Due to shell-shaped fixation, catalysts according to the invention develop higher hydrogenation activities than comparable conventionally prepared shell catalysts, even at low metal concentrations. This is demonstrated by way of example in an example of the hydrogenation of nitrobenzene and crotonic acid (see example 25 below). The optimal concentrations with the highest activities with respect to the metal used are observed at concentrations of up to 2 wt. %.

For a person skilled in the art, it is will be clear from what is described herein that use of the support-fixed metal colloid catalysts as described is not restricted to only the following examples. On the contrary, they may be used in any catalytic reactions in which conventional shell catalysts with one or two metals from groups VIII and IB have hitherto been used. They are especially suitable for hydrogenation reactions, transfer hydrogenation reactions and oxidation reactions with molecular oxygen or hydrogen peroxide. Hydrogenation reactions are usually performed at hydrogen pressures of up to 30 bar, but preferably at atmospheric pressure.

Catalysts according to the invention are especially suitable for hydrogenation or oxidation of isolated and/or conjugated C—C double bonds in aromatic, or also non-aromatic, compounds, of carbonyl compounds, of carboxylic acids and their derivatives, and of unsaturated C—N compounds.

Further areas of use for catalysts according to the invention are the reduction of N—O compounds and the hydrogenolysis of C—O, C—N and C—X compounds (where X=F, Cl, Br, I).

Due to their thin shell structure, catalysts according to the invention are advantageously used for the reaction of substrates with molecular weights of more than 250 g/mol, with which catalysts with thicker shells demonstrate clear reductions in activity due to restrictions on the transport of material to the catalytically active centers.

Higher concentrations are required, for example, for electrocatalysts for fuel cells. These catalysts are mono- to quaternary noble metal catalysts on conductive carbon supports in powdered form. Deposition may be performed in the presence of electrolytes, whereby high activity and stability as a cathode catalyst in a phosphoric acid fuel cell is produced without further aftertreatment. With thermal aftertreatment under an inert gas atmosphere, at temperatures of 100°–1000° C., it was found, surprisingly, that the initial activity and the ageing stability of the catalyst could be decisively improved. In comparison to this, a drastic decrease in activity during ageing is observed with conventionally prepared electrocatalysts.

To prepare catalysts according to the invention, a variety of activated carbons and other inorganic support materials with the properties listed in Table 1 were used in the following examples:

TABLE 1

Catalyst supports

| Material | Average particle size [$\mu$m] | BET surface area [m$^2$/g] | Comments |
|---|---|---|---|
| Activated carbon | | | |
| A | 25 | 1050 | |
| B | 24 | 900 | acid washed |
| C | 20 | 1150 | acid washed |
| D | 24 | 1150 | acid washed |
| $\gamma$-Al$_2$O$_3$ | 26 | 90 | |
| $\alpha$-Al$_2$O$_3$ | 10 | 5 | |
| CaCO$_3$ | 5.3 | 8 | |
| TiO$_2$ | <1 | 50 | |
| Deloxan ®[1] | 100 | 550 | |
| SiO$_2$ | 17 | 60 | |
| Graphite | <1 | 320 | |
| Conductive carbon black | <1 | 80 | graphitized |

[1]Deloxan: Degussa trade mark for an organo-functional polysiloxane

Whereas the activated carbons are highly porous supports whose specific surface area is based largely on the internal surfaces of the pores, $\alpha$-Al$_2$O$_3$, CaCO$_3$, TiO$_2$, graphite and conductive carbon black, for instance, are porous materials whose specific surface areas are virtually identical to the pure geometric surfaces of these finely divided materials.

EXAMPLE 1

69.3 g of activated carbon A were suspended in 1.05 l of deionized water for 15 min at room temperature. In the meantime 0.7 g of platinum in the form of a colloidal sulfobetaine-12-stabilized solution were diluted to 50 ml volume. The diluted Pt colloid solution was added dropwise to the support solution over the course of 5 min. After stirring for 1 h at room temperature, the catalyst was filtered off and washed. The Pt content of the catalyst was 0.9% with respect to its dry weight. The shell thickness of this catalyst, i.e., the depth of penetration of the catalytically active platinum into the particles of activated carbon, was 50 to 100 nm.

The resulting, wet catalyst with a water content of ca. 60 wt. % can be used in this form for catalytic applications or, if required, be dried under vacuum at 80° C.

EXAMPLE 2

69.3 g of acid washed activated carbon B were suspended in 300 ml of deionized water for 15 min at room temperature. In the meantime, 0.7 g of platinum in the form of a sulfobetaine-12-stabilized Pt colloid solution were diluted to 50 ml volume. The diluted Pt colloid solution was added dropwise to the support suspension over the course of 5 min and the reaction mixture was heated to 80° C. After stirring for 20 min at 80° C., the catalyst was filtered hot and washed. A wet catalyst with a residual water content of 47.1 wt. % was obtained. The Pt content of the final catalyst was 0.83 wt. % with respect to its dry weight.

EXAMPLE 3

In the same way as in example 1, a catalyst was prepared on an acid washed activated carbon support A, but only 300 ml of deionized water was used for the support suspension. In addition, for complete adsorption of the Pt colloid, the adsorption time at room temperature had to be extended to 2.5 h. The Pt content of the catalyst was 0.87 wt. % with respect to its dry weight.

EXAMPLE 4

A Pt—Ir catalyst was prepared in the same way as in example 3, starting from a sulfobetaine-12-stabilized Pt—Ir colloid with a Pt/Ir molar ratio of 96:4. The wet catalyst was dried at 80° C. in a vacuum drying oven until the residual water content was less than 2 wt. %. The final catalyst contained 0.90 wt. % of Pt and 0.03 wt. % of Ir.

EXAMPLE 5

0.07 g of magnesium nitrate hexahydrate were dissolved in 300 ml of deionized water and then 19.8 g of activated carbon B support were added. After being suspended for 15 minutes at room temperature, 0.2 g of platinum in the form of a sulfobetaine-12-stabilized Pt colloid solution (50 ml) were added over the course of 5 min. Stirring was continued at room temperature for another 60 min and the catalyst was separated and washed. The Pt content was 0.89 wt. %.

EXAMPLE 6

A catalyst was prepared on activated carbon C in the same way as in example 5. Instead of magnesium nitrate, however, 0.13 g of lanthanum nitrate hexahydrate were used. The Pt content of the final catalyst was 0.87 wt. %.

EXAMPLE 7

A catalyst was prepared in the same way as in example 5 using a sulfobetaine-12-stabilized Pt colloid which had a metal content of 19 wt. % of Pt in the dry substance. This meant that the addition of an electrolyte, such as e.g. magnesium nitrate, was not needed. The final catalyst contained 0.91 wt. % of Pt.

EXAMPLE 8

In the same way as in example 1, double or triple the amount of platinum was adsorbed, added as a 50 ml sulfobetaine-12-stabilized Pt colloid solution. The Pt contents of the final catalysts were 1.61 and 2.3 wt. % respectively.

For adsorption of five times the amount of platinum in 50 ml of a colloid solution, the addition of an electrolyte was required:

0.77 g of magnesium nitrate hexahydrate were dissolved in 300 ml of deionized water and then 19 g of the activated carbon support were added. After suspending for 15 min at room temperature, 0.2 g of platinum in the form of a sulfobetaine-12-stabilized colloid solution (50 ml) were added over the course of 5 min. Stirring was continued for another 60 min at room temperature and the catalyst was separated and washed. The Pt content was 3.92 wt. %.

EXAMPLE 9

69.3 g of activated carbon D were suspended in 1.0 l of deionized water for 15 min at room temperature. 50 ml of a colloidal Pt solution were prepared from 3.5 g of Rewoteric AM DML stabilized Pt colloid powder with a Pt content of 20 wt. % and added dropwise to the support suspension over the course of 5 min. After stirring for 1 h at room temperature, the catalyst was filtered off and washed. The Pt content of the catalyst was 1.03 wt. %.

EXAMPLE 10

A Pt—Ir catalyst was prepared in the same way as in example 9 starting from a Rewoteric AM DML stabilized Pt—Ir colloid with a Pt/Ir molar ratio of 95:5. The final catalyst contained 0.91 wt. % of Pt and 0.02 wt. % of Ir.

EXAMPLE 11

9.9 g of γ-aluminum oxide powder were suspended in 150 ml of deionized water at room temperature. An aqueous sulfobetaine-12-stabilized Pt colloid solution containing 0.1 g of Pt diluted to 20 ml was added dropwise over the course of 5 min. After stirring for a further 60 min at room temperature, the catalyst was filtered off, washed and dried at 80° C. under vacuum until the residual water content was less than 2 wt. %. The Pt content of the final catalyst was 0.88 wt. %.

EXAMPLE 12

9.9 g of α-aluminum oxide powder were suspended in 150 ml of deionized water and heated to 80° C. An aqueous sulfobetaine-12-stabilized Pt colloid solution containing 0.1 g of Pt diluted to 20 ml was added dropwise over the course of 5 min. After stirring for a further 60 min at 80° C., the catalyst was filtered off, washed and dried at 80° C. under vacuum until the residual water content was less 10 than 2 wt. %. The Pt content of the final catalyst was 0.92 wt. %.

EXAMPLE 13

In the same way as in example 11, a catalyst was prepared on calcium carbonate powder. The Pt content of the final catalyst was 1.2 wt. %.

EXAMPLE 14

In the same way as in example 11, a catalyst was prepared on titanium dioxide. The Pt content of the final catalyst was 1.2 wt. %,

EXAMPLE 15

In the same way as in example 12, a catalyst was prepared on Deloxan®. After adding the Pt colloid the temperature for its adsorption was raised to 75° C. The Pt content of the final catalyst was 1.51 wt. %.

EXAMPLE 16

In the same way as in example 11, a catalyst was prepared on silicon dioxide powder. The Pt content of the final catalyst was 0.99 wt. %.

EXAMPLE 17

In the same way as in example 11, a catalyst was prepared on graphite. The Pt content of the final catalyst was 1.06 wt. %.

EXAMPLE 18

In the same way as in example 13, double, triple and five times the amount of platinum, added as 50 ml of a sulfobetaine-12-stabilized Pt colloid solution, was adsorbed. The Pt contents of the final catalysts were 2.04, 2.89 and 5.18 wt. % respectively.

EXAMPLE 19

For the adsorption of double the amount of platinum on aluminum oxide (cf. example 12) in 50 ml of sulfobetaine-12-stabilized Pt colloid solution, the addition of an electrolyte is required:

9.8 g of aluminum oxide powder were suspended in 150 ml of 0.001 molar lanthanum nitrate solution and 0.2 g of platinum in the form of a sulfobetaine-12-stabilized colloid solution (50 ml) were added at room temperature over the course of 5 min. The suspension was heated to 80° C. and stirred for a further 60 min at this temperature. The wet catalyst was filtered hot, washed and dried at 80° C. in a vacuum drying oven until the residual water content was less than 2 wt. %. The Pt content was 1.88 wt. %.

EXAMPLE 20

The preparation of a fixed bed catalyst is described in the following by way of example. The volume of Pt colloid solution was selected so as to ensure complete take-up in accordance with the pore volume.

45 ml of an aqueous sulfobetaine-12-stabilized Pt colloid solution, containing 0.5 g of Pt, were added to a moving bed of 96.6 g of activated carbon granules (BET surface area 1050 $m^2/g$; particle size 2–4 mm) via a dropping funnel over the course of 30 seconds. The mixture was kept in motion for a further 3 min after addition was complete and the catalyst was dried at 80° C. in a vacuum drying oven. The final catalyst contained 0.5 wt. % of Pt.

EXAMPLE 21

9 g of graphitized conductive carbon black (BET surface area 80 $m^2/g$) were suspended in 160 ml of deionized water and heated to 80° C. 1 g of platinum in the form of a sulfobetaine-12-stabilized Pt colloid solution (2.48 wt. % of Pt) was added dropwise over the course of 5 min. Stirring was continued for a further 30 min at 80° C. and then the catalyst was filtered hot and washed. Then the catalyst was dried at 80° C. in a vacuum drying oven until the residual water content was less than 2 wt. %. The final catalyst contained 9.2 wt. % of Pt. For use as electrocatalysts in fuel cells, the protective colloid may be removed by heat treatment between 300° and 900° C., under an inert gas atmosphere.

EXAMPLE 22

Rewoteric AM DML stabilized Pt colloid powder was used in the same way as in example 21. 12 g of colloid powder containing 2.64 g of Pt were resuspended in 100 ml of deionized water and added to an aqueous suspension of 23.76 g of graphitized carbon black support over the course of 5 min. The final catalyst contained 9.5 wt. % of Pt.

EXAMPLE 23

A modified preparation was performed in the same way as in example 21, but after 30 min at 80° C., 12.99 g of lanthanum nitrate hexahydrate, dissolved in 50 ml of deionized water, were added and stirring was continued for a further 30 min. Afterwards, the catalyst was separated, washed and dried in a vacuum drying oven at 80° C. until the residual water content was less than 2 wt. %. The Pt content of the final catalyst was 8.2 wt. %.

EXAMPLE 24

A Pt—Co colloid with a Pt/Co molar ratio of 96:4 was used in the same way as in example 21. Instead of 750 ml of deionized water, 800 ml of $3.6 \times 10^{-2}$ molar lanthanum nitrate solution were used. The final catalyst contained 8.1 wt. % of Pt and 0.11 wt. % of Co.

EXAMPLE 25

A few selected catalysts from the preceding examples were tested regarding their activity in the low pressure hydrogenation of nitrobenzene and crotonic acid.

To hydrogenate nitrobenzene, 1.8 g of nitrobenzene were dissolved in 100 ml of ethanol and hydrogenated in the presence of 0.1 g of catalyst in a low pressure reactor at a temperature of 30° C. Hydrogen was introduced into the solution at a pressure of 1.01 bar via a gas dispersion stirrer. The hydrogen consumption per unit of time was determined using a volume flowmeter. The reaction was performed until complete conversion of the nitrobenzene each time.

The results of hydrogenation are listed in Table 2. The weight-specific activities given in Table 2 are the maximum hydrogen consumption measured per minute and per milligram of platinum.

Hydrogenation of crotonic acid was performed in the same way. 5.8 g of crotonic acid were hydrogenated, however, in 120 ml of ethanol in the presence of 200 mg of a catalyst dried under vacuum.

The test hydrogenations were also performed with various commercial noble metal catalysts on activated carbon supports as well as with the catalysts according to the invention. The catalysts used for this were F 103 R/W (1% Pt on activated carbon), F 103 XKY/W (1% Pt on activated carbon), FI 103 XR/W (0.91% Pt+0.1% Ir on activated carbon), F 107 R/W (5% Pt on activated carbon) and F 407 R/D (5% Pt on activated carbon) from Degussa AG.

TABLE 2

Hydrogenation of nitrobenzene and crotonic acid

| Catalyst | Noble metal | Support | Surfactant | Nitrobenzene activity [ml H$_2$/min.mg$_{Pt}$] | Crotonic acid activity [ml H$_2$/min.mg$_{Pt}$] |
|---|---|---|---|---|---|
| 1 | 0.9% Pt | Activated carbon A | Sulfobetain-12 | 32.2 | 5.00 |
| 2 | 0.83% Pt | Activated carbon B | " | 66.3 | 9.04 |
| 3 | 0.87% Pt | Activated carbon A | " | 44.8 | 5.40 |
| 4 | 0.9% Pt + 0.03% Ir | Activated carbon A | " | 57.0* | 9.46 |
| 5 | 0.89% Pt | Activated carbon B | " | 33.7 | 6.85 |
| 6 | 0.87% Pt | Activated carbon C | " | 41.4 | 8.97 |
| 7 | 0.91% Pt | Activated carbon B | " | 30.8 | 6.15 |
| 8 | 1.61% Pt | Activated carbon A | " | 29.2 | 5.40 |
|  | 2.30% Pt | Activated carbon A | " | 24.8 | 4.65 |
|  | 3.92% Pt | Activated carbon A | " | 15.6 | 4.36 |
| 9 | 1.03% Pt | Activated carbon D | Rewoteric AM DML | 44.7 | 4.56 |
| 10 | 0.91% Pt + 0.02% Ir | Activated carbon D | " | 46.2* | n.d. |
| 11 | 0.88% Pt | γ-Al$_2$O$_3$ | Sulfobetain-12 | 40.9 | 5.75 |
| 13 | 1.20% Pt | CaCO$_3$ | " | 40.0 | 5.67 |
| 14 | 1.20% Pt | TiO2 | " | 30.8 | n.d. |
| 17 | 1.06% Pt | graphite | " | n.d. | 2.08 |
| 18 | 5.18% Pt | CaCO$_3$ | " | n.d. | 2.55 |
| F103 R/W | 1% Pt | Activated carbon |  | 44.0 | 11.2 |
| F103 XKY/W | 1% Pt | " |  | 47.0 | 11.4 |
| F1103 XR/W | 0.9% Pt + 0.1% Ir | " |  | 27.0 | n.d. |
| F107 RW/W | 5% Pt | " |  | n.d. | 7.24 |
| F407 R/D | 5% Pt | CaCO$_3$ |  | n.d. | 2.0 |

*with respect to the sum of active components
n.d. not determined

EXAMPLE 26

To determine their electrochemical properties, the catalysts from examples 21 and 23 were processed to produce gas diffusion electrodes with a PTFE (polytetrafluoroethylene) content of 30 wt. %. For this, the catalysts were dispersed in a suspension of PTFE in a known manner. A PTFE hydrophobized graphite paper was coated with the resulting suspension and the coating was then sintered at 340° C. The coating was adjusted so that the platinum content of the final electrode was about 0.5 mg Pt/cm$^2$.

A 2 square centimeter piece of each of the electrodes prepared in this way was tested in an electrochemical half-cell against a dynamic hydrogen electrode (DHE) in 103% strength phosphoric acid at an operating temperature of 190° C. with respect to its ability to reduce oxygen.

As characterizing data for this, the so-called oxygen mass activity and the potential with a current flow through the fuel cell of 200 mA/mg Pt were measured. The oxygen mass activity is defined as the current flowing at a set potential of 0.9 V, with respect to the amount of platinum in the electrode, measured in mA/mg Pt. When determining these two characteristics, oxygen was used as the reactant.

The potentials given were values corrected to eliminate the internal resistance of the electrochemical cell.

The two characteristics were each measured after a 3 hour conditioning start-up phase. During the start-up phase, the electrochemical half-cell was operated at a temperature of 190° C., but it remained on open circuit so that no current could flow. To determine the ageing stability, the potential at 200 mA/mg Pt was determined after an additional conditioning period of a further 19 hours. The operating conditions during this conditioning period corresponded to the conditions during the start-up phase.

The catalysts according to the invention from examples 21 and 23 are characterized by a high ageing stability (see Table 3).

TABLE 3

| Catalyst | | O$_2$ mass activity at 0.9 v | | | Potential in mv at 200 mA/mg Pt | | |
|---|---|---|---|---|---|---|---|
| Example | wt. % Pt | 3 h | 22 h | Δ | 3 h | 22 h | Δ |
| C6 | 10.0 | 49 | 32 | 17 | 830 | 795 | 35 |
| 21 | 9.2 | 26 | 17 | 9 | 804 | 759 | 45 |
| 21 (350° C.) | 10.0 | 27 | 24 | 3 | 800 | 788 | 12 |
| 21 (900° C.) | 10.0 | 40 | 35 | 5 | 823 | 815 | 8 |
| 23 | 8.2 | 47 | 30 | 17 | 833 | 802 | 31 |

3 measurements were performed using the catalyst from example 21. For the second and third measurements, the catalyst was calcined for about one hour at 350° C. and 900° C. respectively, to decompose the colloid. This treatment led to an essential increase in ageing stability. It is noteworthy that the catalyst from example 23, which was prepared by adding a lanthanum electrolyte to the colloid solution, without calcining, had much better mass activity and ageing stability than the catalyst from example 21.

Further variations and modifications of the foregoing will be apparent to those skilled in the art and such variations and modifications are intended to be encompassed by the claims that are appended hereto.

German Priority Application P 44 43 701.3 filed on Dec. 8, 1994 is relied on and incorporated by reference in its entirety.

We claim:

1. A process for preparing a shell catalyst comprising at least one metal selected from the groups VIII and IB of the Periodic Table of Elements on a powdered or shaped support, wherein said metal is present on said support in finely divided form within an outer shell with a thickness of at most 200 nm with crystallite sizes of at most 10 nm in concentrations of 0.05 to 35 wt. % with respect to the dry weight of the catalyst, said process comprising mixing an aqueous suspension of said support with an aqueous colloidal solution of a preformed and reduced, surfactant-stabilized mono- or bimetallic colloid of a metal selected from groups VIII and IB of the Periodic Table of Elements to form a reaction mixture in order to fix said colloid on said support wherein said surfactant is a hydrophilic surfactant selected from the group consisting of betains, (chlorohydroxypropyl) alkyldimethylammoinum salts, fatty alcohol-polyglycol ethers, polyoxymethylene-carbohyrate-fatty alkyl esters, sodium cocoamidoethyl-N-hydroxyethyl glycinate and amphiphilic sugar surfactants.

2. The process according to claim 1, wherein said betains are (trialkylammonio)-alkylsulfonates, alkyl-N,N-dimethyl-N-carboxymethylammonium betains, or alkylamidopropyl betains.

3. The process according to claim 2, wherein said betains are 3-(dimethyldodecylammonio)-propanesulfonate, lauryl-N,N-dimethyl-N-carboxymethyl-ammonium betain or cocoamidopropyl betain.

4. The process according to claim 1, wherein said surfactants are (chlorohydroxypropyl)alkyldimethylammonium salts.

5. The process according to claim 1, wherein said fatty alcohol-polyglycol ether is polyoxyethylene-lauryl ether.

6. The process according to claim 1, wherein said polyoxyethylene-carbohydrate fatty alkyl ester is sorbitane monolaurate.

7. The process according to claim 1, wherein said surfactant is sodium cocoamidoethyl-N-hydroxyethyl glycinate.

8. The process according to claim 1, wherein said amphiphilic sugar is an alkylpolyglycoside.

9. The process according to claim 1, wherein said preformed and reduced, hydrophilic surfactant-stabilized mono- or bimetallic colloid is prepared by reducing the salt of said mono- or bimetallic colloid in the presence of said surfactant in either an aqueous or an organic phase.

10. The process according to claim 1, wherein said preformed and reduced, hydrophilic surfactant-stabilized mono- or bimetallic colloid has an average particle size of between 1 and about 50 nm.

11. The process according to claim 1, wherein said average particle size is less than 10 nm.

12. The process according to claim 11, wherein said average particle size is less than 5 nm.

13. The process according to claim 12, wherein said average particle size is less than 3 nm.

14. The process according to claim 9, further comprising isolating said colloid in the form of a powder.

15. The process according to claim 14, further comprising dispersing said powder in water.

16. The process according to claim 1 wherein the concentration of said colloid in said colloidal solution is up to 25 wt. % of metal with respect to the total weight of said solution.

17. The process according to claim 14 wherein the metal content of the dry weight of said powder is at least 5 wt. %.

18. The process according to claim 1, further comprising heating said reaction mixture to a temperature of at least 30° C.

19. The process according to claim 18 wherein said temperature is between 30° to 95° C.

20. The process according to claim 19 wherein said temperature is between 50° to 85° C.

21. The process according to claim 1 wherein said suspension of said support further comprises an electrolyte selected from the group consisting of salts of the groups IA, IIA, and IIIA of the Periodic Table of Elements and the lanthanides.

22. The process according to claim 1, wherein said support is carbon or an oxide of at least one metal from groups IIA to VA and IB to VIIB and VIII of the Periodic Table of Elements.

23. The process according to claim 1, wherein said support is selected from the group consisting of carbonates, sulfates, zeolites, organofunctional polysiloxanes and ion exchange resins.

24. The process according to claim 22, wherein said carbon is selected from the group consisting of activated carbon, carbon black, graphitized carbon black, graphite, carbides, supported carbides and their physical mixtures.

25. The process according to claim 22, wherein said oxide is selected from the group consisting of aluminum oxide, silicon dioxide, titanium oxide, zirconium oxide, magnesium oxide and mixed oxides thereof.

26. The process according to claim 1, further comprising adding an electrolyte to said reaction mixture.

27. The process according to claim 1, further comprising filtering said catalyst from said reaction mixture and washing.

28. The process according to claim 27, further comprising drying under a vacuum.

29. The process according to claim 28, further comprising heating under an inert gas atmosphere at a temperature between 100° and 1000° C.

30. The process according to claim 29, wherein said temperature is between 200° and 500° C.

31. The process according to claim 29, wherein said temperature is between 300° and 900° C.

32. The process according to claim 1 further comprising fixing said preformed and reduced, surfactant-stabilized metal colloid onto said supports by redispersing said colloids in water and adding the colloidal solution admixture to said aqueous suspension of said support.

33. The process according to claim 1 wherein said aqueous colloidal solution is homogeneous.

* * * * *